(12) United States Patent
Iwasawa

(10) Patent No.: US 7,433,131 B2
(45) Date of Patent: Oct. 7, 2008

(54) ZOOM LENS AND IMAGING APPARATUS

(75) Inventor: Yoshito Iwasawa, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/569,232

(22) PCT Filed: Aug. 27, 2004

(86) PCT No.: PCT/JP2004/012778

§ 371 (c)(1),
(2), (4) Date: Sep. 25, 2006

(87) PCT Pub. No.: WO2005/026808

PCT Pub. Date: Mar. 24, 2005

(65) Prior Publication Data

US 2007/0139786 A1 Jun. 21, 2007

(30) Foreign Application Priority Data

Sep. 8, 2003 (JP) .............................. 2003-315072

(51) Int. Cl.
*G02B 15/14* (2006.01)

(52) U.S. Cl. ........................ 359/683; 359/686; 359/726; 359/764

(58) Field of Classification Search ......... 359/676–692, 359/726–728, 737–740, 833–837
See application file for complete search history.

(56) References Cited

U.S. PATENT DOCUMENTS

| 6,754,446 | B2 | 6/2004 | Hagimori et al. |
| 2003/0161620 | A1 | 8/2003 | Hagimori et al. |
| 2004/0051960 | A1 | 3/2004 | Mihara |
| 2004/0201902 | A1 | 10/2004 | Mihara et al. |
| 2005/0007678 | A1* | 1/2005 | Sueyoshi ................... 359/683 |

FOREIGN PATENT DOCUMENTS

| EP | 773460 | 5/1997 |
| JP | 08-248318 A | 9/1996 |
| JP | 2003-043354 A | 2/2003 |
| JP | 2003-202500 A | 7/2003 |
| JP | 2004-93649 A | 3/2004 |
| JP | 2004-264585 A | 9/2004 |

\* cited by examiner

*Primary Examiner*—Evelyn A. Lester
(74) *Attorney, Agent, or Firm*—Lerner, David, Littenberg, Krumholz & Mentlik, LLP

(57) ABSTRACT

Provided is a zoom lens allows size reduction in the depth direction and compactness. The zoom lens includes a plurality of lens groups (GR1 to GR5) and performs zooming by changing an inter-group distance. Of the plurality of lens groups (GR1 to GR5), a first lens group (GR1) on the most object side has a positive refractive power and is fixed. A reflection member for bending an optical axis is provided in the first lens group (GR1) and the reflection member is formed of a rectangular prism (P) having a negative refractive power. In addition, an imaging apparatus using the zoom lens is provided.

16 Claims, 12 Drawing Sheets

ZOOM LENS AND IMAGING APPARATUS

TECHNICAL FIELD

The present invention relates to a zoom lens that is compact, that has a high variable rate, and that is well suited for adaptation in photography optical systems of digital input and output apparatuses, such as digital still cameras and digital video cameras. The invention further relates to an image apparatus using the zoom lens.

BACKGROUND ART

In recent years, imaging apparatuses, such as digital still cameras, using the solid state image devices have been widely spread. With widespread use of such digital still cameras, correspondingly higher image quality is demanded. In particular, photography lenses, especially, zoom lenses having high imaging performance corresponding to solid state image devices having a large number of pixels are sought for the use with a digital still camera having a large number of pixels. Further, compactness is strongly demanded, and compact and high performance zoom lenses are sought. Further, technological development advances to enhance compactness in the optical axis direction in the manner that a prism is inserted between lenses and the optical system is bent(refer to Japanese Unexamined Patent Application Publications Nos. 8-248318 and No. 2003-43354, for example).

However, in the optical system disclosed in Japanese Unexamined Patent Application Publication No. 8-248318, compactness is achieved in the manner that a prism is used in one group of a zoom type arrangement of positive-negative-positive-positive groups to thereby bend the optical axis. However, since lenses are arranged closer to the object side than to a reflection member, sufficient compactness cannot be achieved.

In the optical system disclosed in Japanese Unexamined Patent Application Publication No. 2003-43354, a prism having a negative refraction power is disposed on the most object side, whereby compactness of a bent portion is achieved. However, since the configuration is of a minus lead type, a diaphragm mechanism is large and the diaphragm mechanism moves along the optical axis during zooming, so that sufficient compactness for those including a lens barrel is not sufficiently achieved.

DISCLOSURE OF INVENTION

The present invention is made to solve problems such as described above. More specifically, the present invention provides a zoom lens including a plurality of lens groups and performing zooming by changing an inter-group distance, in which, of the plurality of lens groups, a lens group on a most object side has a positive refractive power and is fixed, a reflection member for bending an optical axis is provided in that lens group, and the reflection member is formed of a prism having a negative refractive power. Further, an imaging apparatus using the zoom lens is provided.

In addition, the present invention provides a zoom lens including a plurality of lens groups and performing zooming by changing an inter-group distance, the zoom lens being characterized in that a reflective member for bending an optical axis is disposed in a lens group on a most object side of the plurality of lens groups, the reflection member is formed of a prism having a negative refractive power, and an aperture position is fixed during zooming. Further, an imaging apparatus using the zoom lens is provided.

According to the present invention, by bending the optical system, compactness in the optical axis direction can be achieved, and a zoom lens excellent in optical characteristics can be configured.

Consequently, the present invention enables improving the imaging performance and achieving compactness of zoom lenses for use with, for example, video cameras and digital still cameras.

BEST MODE FOR CARRYING OUT THE INVENTION

An embodiment and examples of the present invention will be described herebelow. An embodiment is characterized in that in a zoom lens, a reflection member for bending an optical axis is included in one fixed lens group having a positive refractive power, and the reflection member is formed of a prism having a negative refractive power More specifically, a zoom lens according to the present embodiment includes a plurality of lens groups and performs zooming by changing an inter-group distance, in which, of the plurality of lens groups, a lens group on a most object side has a positive refractive power and is fixed, a reflection member for bending an optical axis is provided in the lens group, and the reflection member is formed of a prism having a negative refractive power. In this case, the reflection member may be disposed on the most object side.

In addition, a zoom lens according to the present embodiment includes a plurality of lens groups and performing zooming by changing an inter-group distance, in which a reflective member for bending an optical axis is disposed in a lens group on a most object side of the plurality of lens groups, the reflection member is formed of a prism having a negative refractive power, and an intermediate aperture position is fixed during zooming. In this case, the reflection member may be disposed on the most object side.

Preferably, in the zoom lens according to the present embodiment, an aperture is fixed during zooming.

In addition, preferably, in the zoom lens according to the present embodiment, the reflective member is formed of a prism satisfying Conditional Expression (1):

$$1.7 < Npd \quad \text{(Conditional Expression (1))}$$

where,

Npd=refraction index of the prism forming the reflective member.

Conditional expression (1) defines the refraction index of the reflection member. In the case that the refraction index of the prism is lower than or equal to a lower limit of Conditional Expression (1), increasing the refraction index of the prism causes the curvature of an incident surface to be excessively increased, thereby making it difficult, for example, to correct distortion and image plane and to achieve the compactness.

In addition, the prism preferably satisfies Conditional Expression (2):

$$1.8 < Npd \quad \text{(Conditional Expression (2))}$$

where,

Npd=refraction index of the prism forming the reflective member

Preferably, the prism having the negative refractive power is formed by molding. However, the prism may be formed by cementing a lens with a prism. Further, distortion may be corrected using a process of electric signals.

EMBODIMENTS

Figure 1:
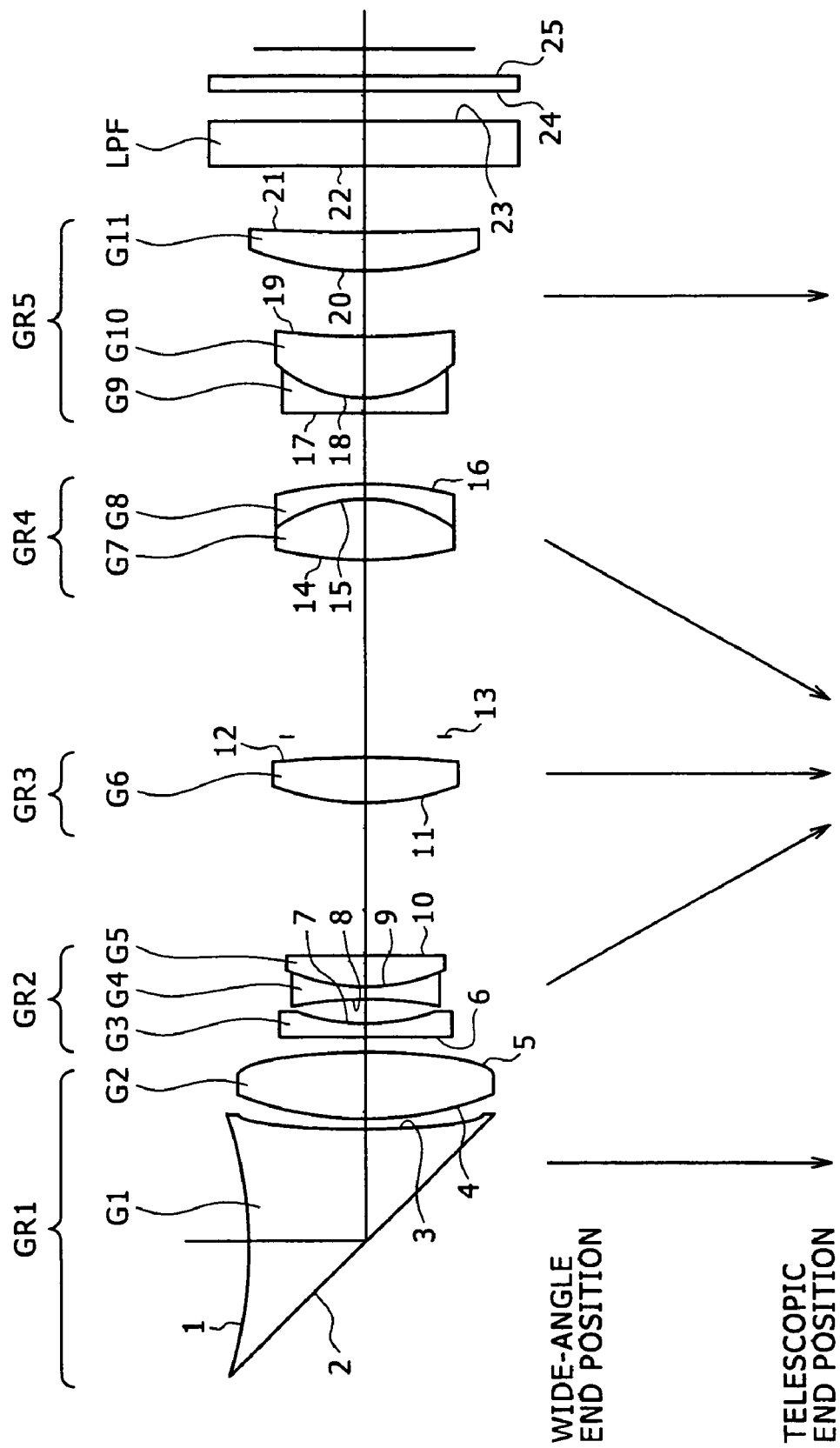
FIG. 1 is a lens configuration diagram of a zoom lens according to a first embodiment in a short focal distance position.

Embodiments of the present invention will be described hereinbelow. FIG. 1 is a configuration diagram of a zoom lens according to a first embodiment. Arrows in the drawing indicate movement paths of respective lens groups from a wide-angle end position to a telescopic end position. The zoom lens according to the first embodiment is configured, in order from an object side, a positive first lens group GR1, a negative second lens group GR2, a positive third lens group GR3, a positive fourth lens group GR4, and a negative fifth lens group GR5. The first lens group GR1 includes a prism G1, which has a negative refractive power for 90° bending the optical axis, and a positive lens G2 having two aspheric surfaces.

The second lens group GR2 includes a negative lens G3 and a cemented lens of a negative lens G4 and a positive lens G5. The third lens group GR3 includes a positive lens G6 having two aspheric surfaces.

The fourth lens group GR4 is formed of a cemented lens of a positive lens G7, which has an aspheric surface on the object side, and a negative lens G8. The fifth lens group GR5 includes a cemented lens of a negative lens G9 and a positive lens G10, and a positive lens G11 having an aspheric surface on the object side.

Figure 2:
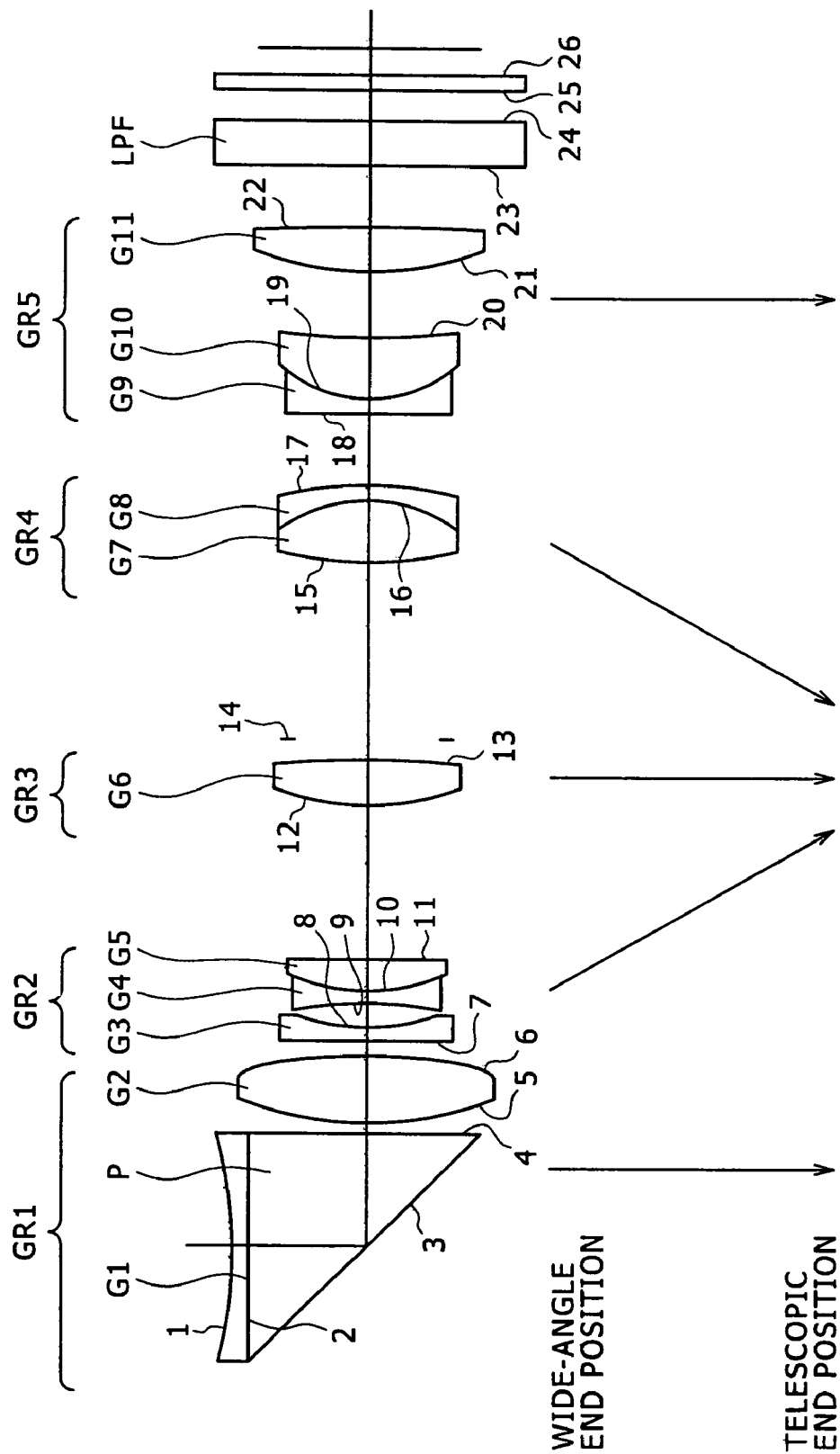
FIG. 2 is a lens configuration diagram of a zoom lens according to a second embodiment in a short focal distance position.

FIG. 2 shows a configuration diagram of a zoom lens according to a second embodiment. Arrows in the drawing indicate movement paths of respective lens groups from a wide-angle end position to a telescopic end position. The zoom lens according to the second embodiment includes, in order from an object side, a positive first lens group GR1, a negative second lens group GR2, a positive third lens group GR3 having an aspheric surface on the object side, a positive fourth lens group GR4, and a negative fifth lens group GR5. The first lens group GR1 includes a cemented lens of a prism G1, which has an aspheric surface on the object side, and a rectangular prism P for 90° bending the optical axis, and a positive lens G2 having two aspheric surfaces.

The second lens group GR2 includes a negative lens G3 and a cemented lens of a negative lens G4 and a positive lens G5. The third lens group GR3 is formed of a positive lens G6 having two aspheric surfaces.

The fourth lens group GR4 includes a cemented lens of a positive lens G7, which has an aspheric surface on the object side, and a negative lens G8. The fifth lens group GR5 includes a cemented lens of a negative lens G9 and a positive lens G10, and a positive lens G11 having an aspheric surface on the object side.

Figure 3:
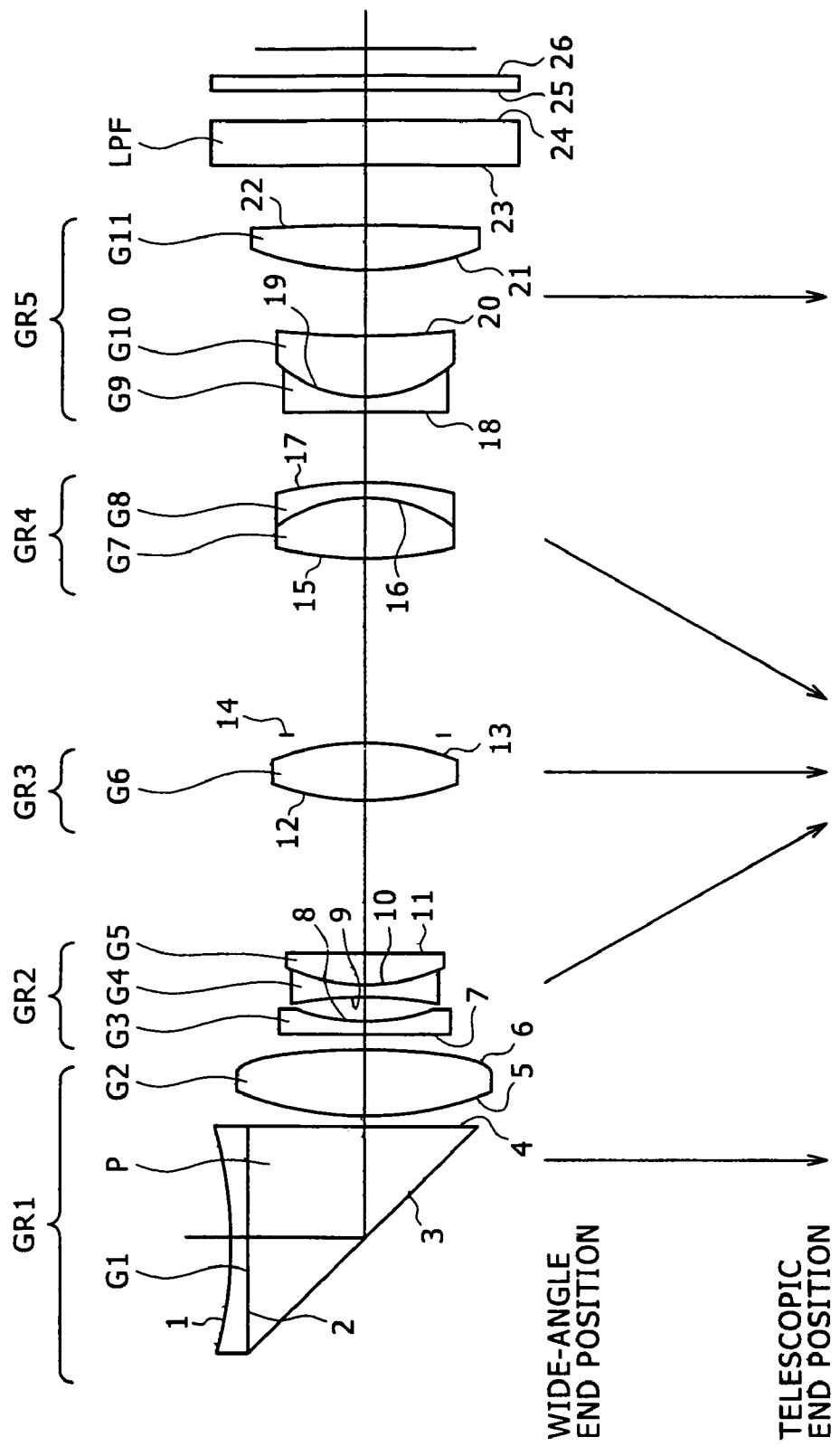
FIG. 3 is a lens configuration diagram of a zoom lens according to a third embodiment in a short focal distance position.

FIG. 3 shows a configuration diagram of a zoom lens according to a third embodiment. Arrows in the drawing indicate movement paths of respective lens groups from a wide-angle end position to a telescopic end position. The zoom lens according to the third embodiment includes, in order from an object side, a positive first lens group GR1, a negative second lens group GR2, a positive third lens group GR3, a positive fourth lens group GR4, and a negative fifth lens group GR5. The first lens group GR1 is configured of a prism G1, which has an aspheric surface on the object side, and a rectangular prism P for 90° bending the optical axis, and a positive lens G2 having two aspheric surfaces.

The second lens group GR2 includes a negative lens G3 and a cemented lens of a negative lens G4 and a positive lens G5. The third lens group GR3 is formed of a positive lens G6 having two aspheric surfaces.

The fourth lens group GR4 is formed of a cemented lens of a positive lens G7, which has an aspheric surface on the object side, and a negative lens G8. The fifth lens group GR5 is configured of a cemented lens of a negative lens G9 and a positive lens G10, and a positive lens G11 having an aspheric surface on the object side.

Tables 1 to 3 below show data of the zoom lenses according to the first to embodiments.

TABLE 1

FNo. = 3.60~3.88~4.44
f = 6.91~11.62~19.55
ω = 29.97~17.80~10.67

| Surface No. | R | | d | nd | vd |
| --- | --- | --- | --- | --- | --- |
| 1: | −12.158 | (ASP) | 4.210 | 1.84666 | 23.785 |
| 2: | INFINITY | (Reflective surface) | 4.210 | 1.84666 | 23.785 |

TABLE 1-continued

FNo. = 3.60~3.88~4.44
f = 6.91~11.62~19.55
ω = 29.97~17.80~10.67

| | | | | | |
|---|---|---|---|---|---|
| 3: | 28.998 | (ASP) | 0.500 | | |
| 4: | 8.370 | (ASP) | 2.467 | 1.80611 | 40.734 |
| 5: | −23.519 | (ASP) | 0.500~3.588~5.813 | | |
| 6: | −513.611 | | 0.500 | 1.83500 | 42.984 |
| 7: | 7.082 | | 0.906 | | |
| 8: | −12.247 | | 0.450 | 1.80420 | 46.503 |
| 9: | 6.447 | | 1.150 | 1.92286 | 20.884 |
| 10: | 30.533 | | 5.813~2.725~0.500 | | |
| 11: | 9.684 | (ASP) | 1.576 | 1.69350 | 53.201 |
| 12: | −41.858 | (ASP) | 1.000 | | |
| 13: | Aperture | | 6.610~4.389~2.045 | | |
| 14: | 13.103 | (ASP) | 2.267 | 1.69350 | 53.201 |
| 15: | −5.264 | | 0.550 | 1.80518 | 25.456 |
| 16: | −14.202 | | 2.703~4.924~7.267 | | |
| 17: | −85.495 | | 0.500 | 1.83400 | 37.345 |
| 18: | 4.379 | | 2.300 | 1.49700 | 81.608 |
| 19: | 25.455 | | 2.500 | | |
| 20: | 12.953 | (ASP) | 1.487 | 1.84666 | 23.785 |
| 21: | 77.234 | | 2.368 | | |
| 22: | INFINITY | | 1.700 | 1.51680 | 64.198 |
| 23: | INFINITY | | 1.120 | | |
| 24: | INFINITY | | 0.500 | 1.51680 | 64.198 |
| 25: | INFINITY | | | | |

| Surface No. | ε | $A^4$ | $A^6$ | $A^8$ | $A^{10}$ |
|---|---|---|---|---|---|
| 1 | 1 | 0.695009E−03 | −0.769817E−05 | 0.175714E−07 | 0.119437E−08 |
| 3 | 1 | −0.705248E−03 | 0.143439E−03 | −0.907799E−05 | 0.242336E−06 |
| 4 | 1 | −0.184995E−02 | 0.143335E−03 | −0.958467E−05 | 0.204369E−06 |
| 5 | 1 | −0.657112E−03 | 0.302629E−04 | −0.303252E−05 | 0.612240E−07 |
| 11 | 1 | 0.267075E−03 | −0.387128E−04 | 0.854256E−05 | −0.314089E−06 |
| 12 | 1 | 0.582935E−03 | −0.354368E−04 | 0.876895E−05 | −0.315734E−06 |
| 14 | 1 | −0.120598E−03 | 0.291949E−05 | −0.171268E−06 | 0.112251E−07 |
| 20 | 1 | −0.250658E−04 | 0.122110E−05 | 0.565389E−06 | −0.225582E−07 |

TABLE 2

FNo. = 3.60~3.86~4.36
f = 6.90~11.62~19.55
ω = 29.98~17.81~10.66

| Surface No. | R | | d | nd | νd |
|---|---|---|---|---|---|
| 1: | −12.0223 | (ASP) | 0.600 | 1.84666 | 23.785 |
| 2: | INFINITY | | 4.350 | 1.84666 | 23.785 |
| 3: | INFINITY | (Reflective surface) | 4.350 | 1.84666 | 23.785 |
| 4: | INFINITY | | 0.400 | | |
| 5: | 8.583 | (ASP) | 2.346 | 1.77377 | 47.200 |
| 6: | −71.247 | (ASP) | 0.518~3.615~5.899 | | |
| 7: | 36.344 | | 0.500 | 1.83500 | 42.984 |
| 8: | 6.109 | | 1.041 | | |
| 9: | −11.555 | | 0.450 | 1.80420 | 46.503 |
| 10: | 5.921 | | 1.150 | 1.92286 | 20.884 |
| 11: | 27.935 | | 5.881~2.784~0.500 | | |
| 12: | 9.555 | (ASP) | 1.554 | 1.69350 | 53.201 |
| 13: | −42.514 | (ASP) | 1.000 | | |
| 14: | Aperture | | 6.200~4.152~2.032 | | |
| 15: | 11.826 | (ASP) | 2.267 | 1.69350 | 53.201 |
| 16: | −5.549 | | 0.550 | 1.84666 | 23.785 |
| 17: | −14.233 | | 2.508~4.556~6.676 | | |
| 18: | −39.634 | | 0.500 | 1.80610 | 33.269 |
| 19: | 4.149 | | 2.400 | 1.49700 | 81.608 |
| 20: | 13.820 | | 2.600 | | |
| 21: | 13.333 | (ASP) | 1.752 | 1.84666 | 23.785 |
| 22: | −43.749 | | 2.400 | | |
| 23: | INFINITY | | 1.700 | 1.51680 | 64.198 |
| 24: | INFINITY | | 1.120 | | |
| 25: | INFINITY | | 0.500 | 1.51680 | 64.198 |
| 26: | INFINITY | | | | |

TABLE 2-continued

FNo. = 3.60~3.86~4.36
f = 6.90~11.62~19.55
ω = 29.98~17.81~10.66

| Surface No. | ε | $A^4$ | $A^6$ | $A^8$ | $A^{10}$ |
|---|---|---|---|---|---|
| 1  | 1 |  0.593353E−03 | −0.816542E−05 |  0.111330E−06 | −0.675203E−09 |
| 5  | 1 | −0.493322E−03 | −0.687128E−05 |  0.916164E−07 | −0.278994E−07 |
| 6  | 1 | −0.641626E−04 | −0.386299E−05 | −0.643382E−06 | −0.259664E−09 |
| 12 | 1 |  0.430269E−04 | −0.354837E−04 |  0.341845E−05 | −0.786579E−07 |
| 13 | 1 |  0.322425E−03 | −0.318420E−04 |  0.319048E−05 | −0.762601E−07 |
| 15 | 1 | −0.159259E−03 |  0.863017E−05 | −0.901992E−06 |  0.329121E−07 |
| 21 | 1 | −0.380161E−04 |  0.184751E−05 |  0.406406E−06 | −0.131998E−07 |

TABLE 3

FNo. = 3.60~3.83~4.35
f = 6.91~11.62~19.61
ω = 33.05~18.36~10.65

| Surface No. | R | | d | nd | vd |
|---|---|---|---|---|---|
| 1:  | −20.146  |                     | 0.500             | 1.84666 | 23.785 |
| 2:  | INFINITY |                     | 4.480             | 1.92286 | 20.884 |
| 3:  | INFINITY | (Reflective surface)| 4.480             | 1.92286 | 20.884 |
| 4:  | INFINITY |                     | 0.400             |         |        |
| 5:  |  15.683  | (ASP)               | 2.267             | 1.77377 | 47.200 |
| 6:  | −19.392  | (ASP)               | 0.500~3.492~5.624 |         |        |
| 7:  |  35.414  |                     | 0.500             | 1.88300 | 40.805 |
| 8:  |   5.866  |                     | 1.088             |         |        |
| 9:  |  −8.543  |                     | 0.450             | 1.80420 | 46.503 |
| 10: |   5.999  |                     | 1.150             | 1.92286 | 20.884 |
| 11: |  47.158  |                     | 5.624~2.632~0.500 |         |        |
| 12: |  10.970  | (ASP)               | 1.667             | 1.58913 | 61.251 |
| 13: | −13.076  | (ASP)               | 1.000             |         |        |
| 14: | Aperture |                     | 6.609~4.354~2.032 |         |        |
| 15: |  10.229  | (ASP)               | 2.762             | 1.58913 | 61.251 |
| 16: |  −5.504  |                     | 0.550             | 1.92286 | 20.884 |
| 17: |  −9.874  |                     | 1.737~3.993~6.314 |         |        |
| 18: | −75.817  |                     | 0.500             | 1.83400 | 37.345 |
| 19: |   4.959  |                     | 2.440             | 1.49700 | 81.608 |
| 20: |   8.130  |                     | 2.900             |         |        |
| 21: |  14.663  | (ASP)               | 1.905             | 1.84666 | 23.785 |
| 22: | −22.823  |                     | 2.300             |         |        |
| 23: | INFINITY |                     | 1.700             | 1.51680 | 64.198 |
| 24: | INFINITY |                     | 1.120             |         |        |
| 25: | INFINITY |                     | 0.500             | 1.51680 | 64.198 |
| 26: | INFINITY |                     |                   |         |        |

| Surface No. | ε | $A^4$ | $A^6$ | $A^8$ | $A^{10}$ |
|---|---|---|---|---|---|
| 5  | 1 | −0.105956E−03 | −0.586460E−06 | −0.706848E−08 | −0.806784E−08 |
| 6  | 1 |  0.267324E−04 |  0.922398E−06 | −0.181160E−06 | −0.288624E−08 |
| 12 | 1 | −0.859121E−04 | −0.141438E−04 |  0.504154E−06 |  0.203452E−07 |
| 13 | 1 |  0.234640E−03 |  0.174123E−04 | −0.470843E−05 |  0.312608E−06 |
| 15 | 1 | −0.157450E−03 |  0.314827E−04 | −0.519568E−05 |  0.312610E−06 |
| 21 | 1 |  0.333160E−04 | −0.144255E−04 |  0.107968E−05 | −0.251109E−07 |

In each of the tables, "FNo." indicates the F number; "f" indicates the focal distance; "ω" indicates the half angle of viewing; "R" indicates the radius of curvature, "d" indicates the inter-lens surface distance; "nd" indicates the refraction index with respect to the d line; and "vd" indicates the Abbe number. In addition, each respective surface shown with "(ASP)" is an aspheric surface, and the aspheric surface profile is represented by equation 1 below.

$$x = \frac{y^2 \cdot c^2}{1 + \sqrt{1 - \varepsilon \cdot y^2 \cdot c^2}} + \sum A^i \cdot Y^i \quad \text{(Equation 1)}$$

where, x = distance in the optical axis direction from the lens surface apex y = height in the direction perpendicular to the optical axis c = paraxial curvature at the lens apex ε = conic constant $A^i$ = ith aspheric surface coefficient Table 4 below shows respective numeric values for satisfying conditions of Conditional Expression (1) for the zoom lenses shown and described in conjunction with the first to third embodiments.

TABLE 4

| Coditional expression | First embodiment | Second embodiment | Third embodiment |
|---|---|---|---|
| (1) Npd | 1.847 | 1.847 | 1.923 |

Figure 4:
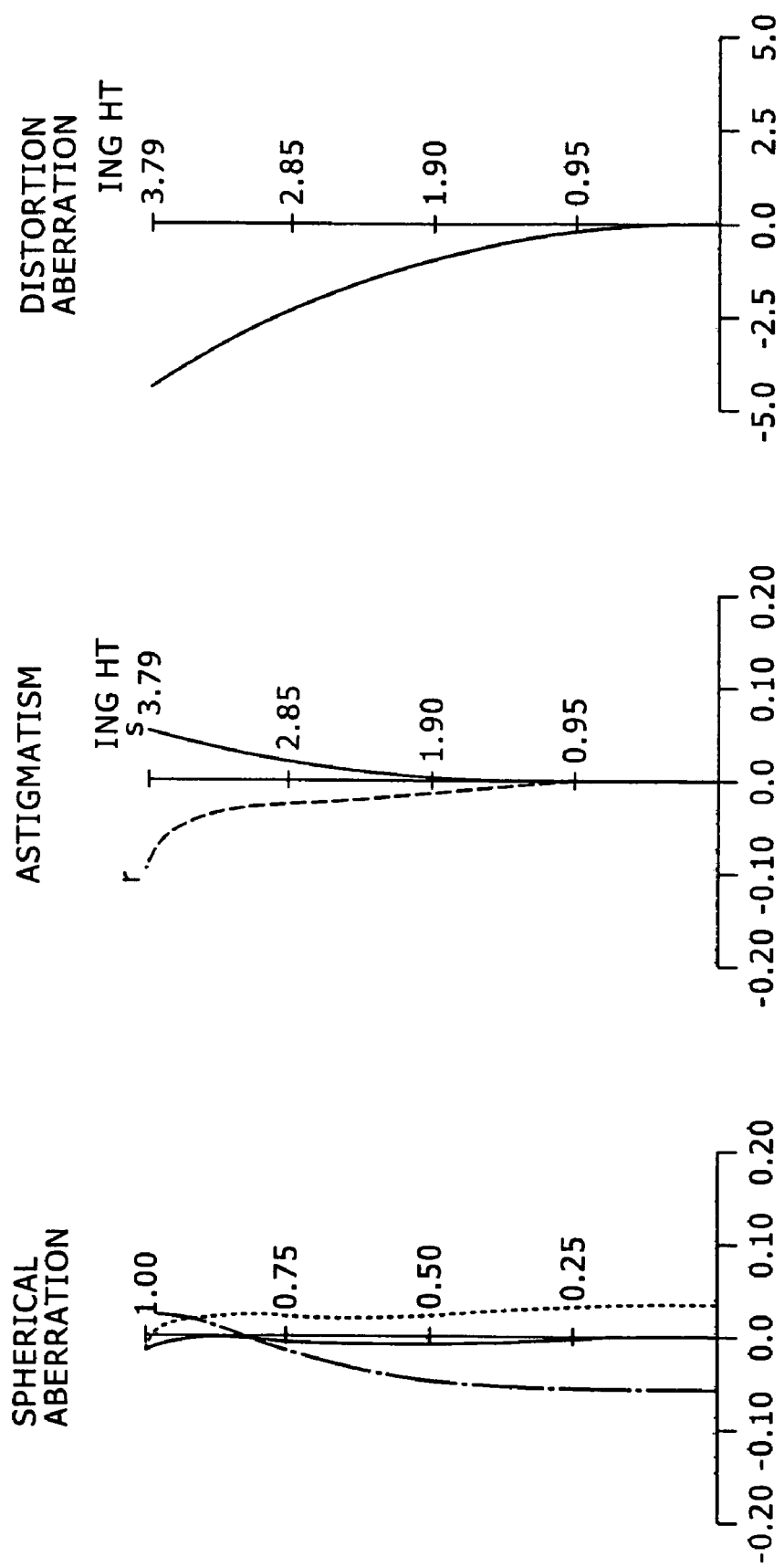
FIG. 4 shows various aberration diagrams of the zoom lens according to the first embodiment in the short focal distance position.
Figure 5:
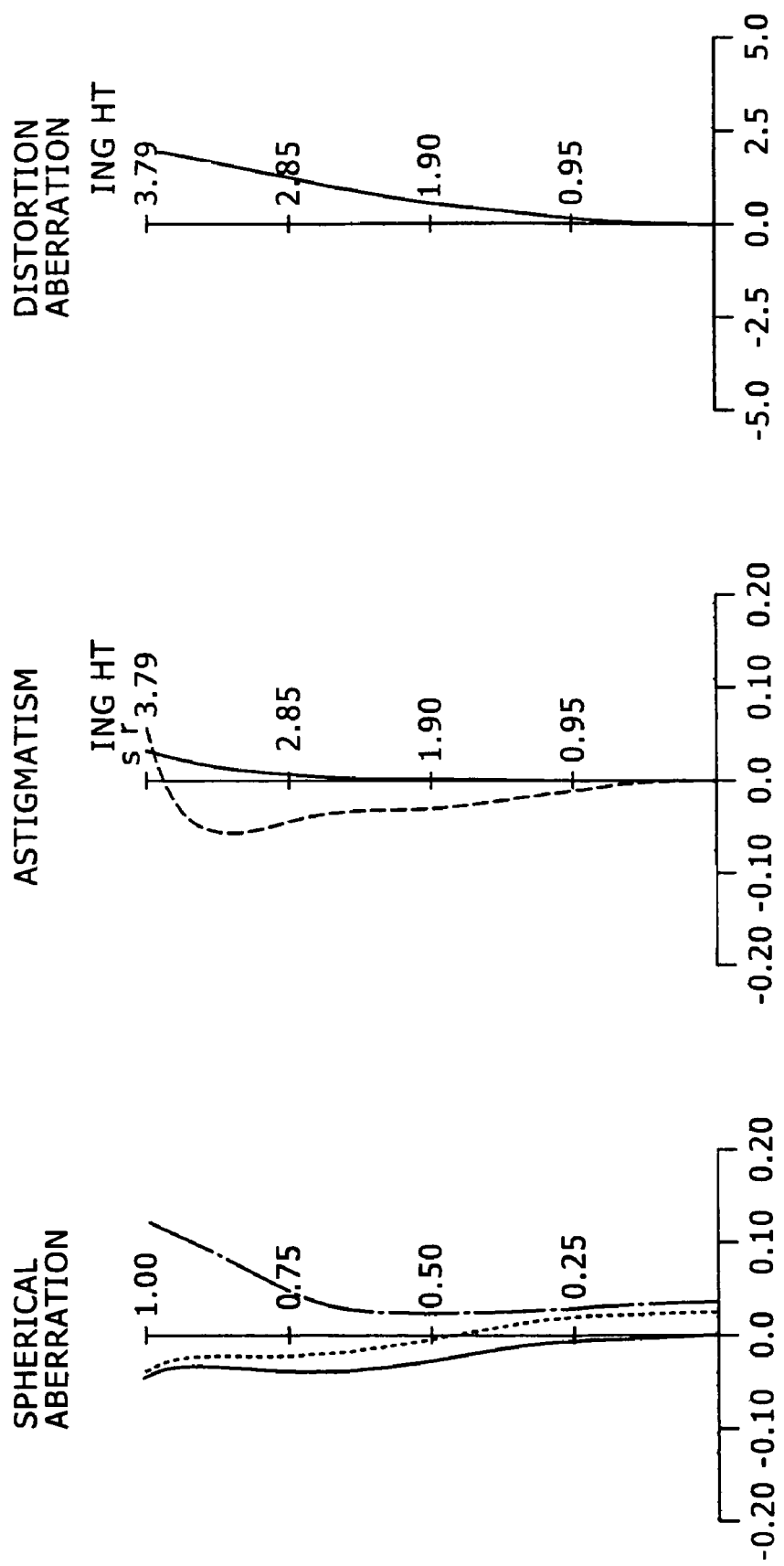
FIG. 5 shows various aberration diagrams of the zoom lens according to the first embodiment in an intermediate focal distance position.
Figure 6:
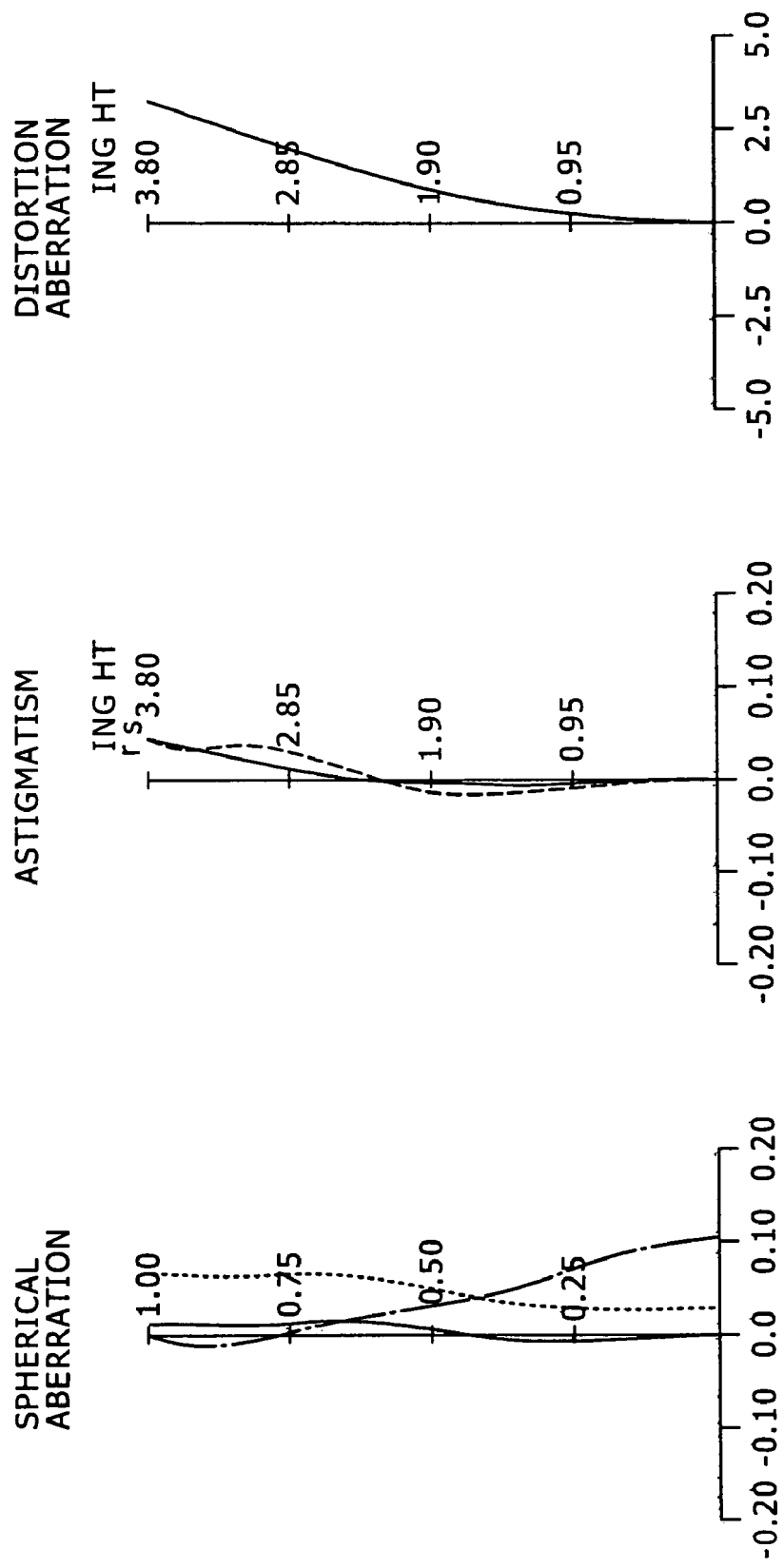
FIG. 6 shows various aberration diagrams of the zoom lens according to the first embodiment in a long focal distance position.
Figure 7:
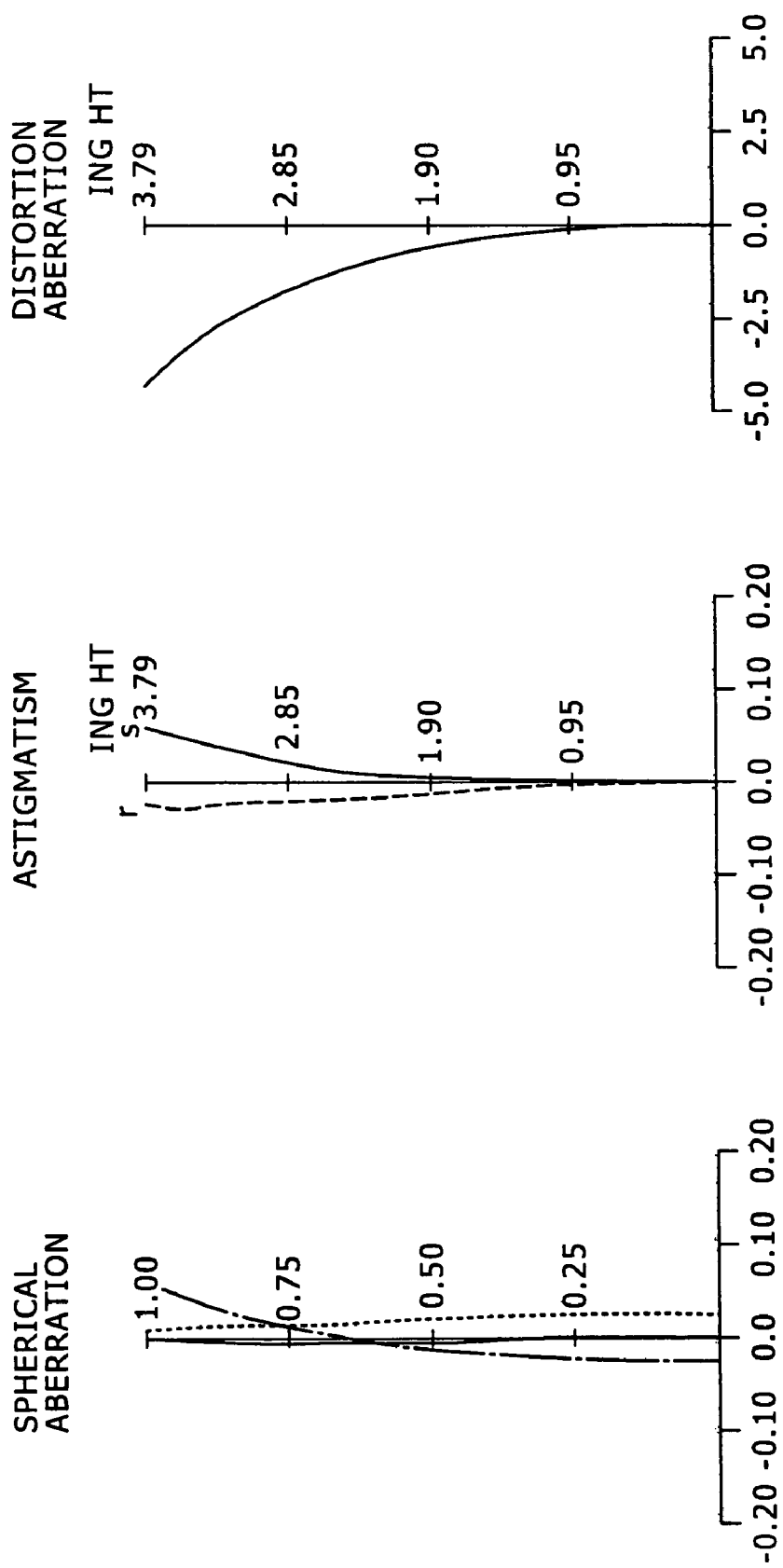
FIG. 7 shows various aberration diagrams of the zoom lens according to the second embodiment in the short focal distance position.
Figure 8:
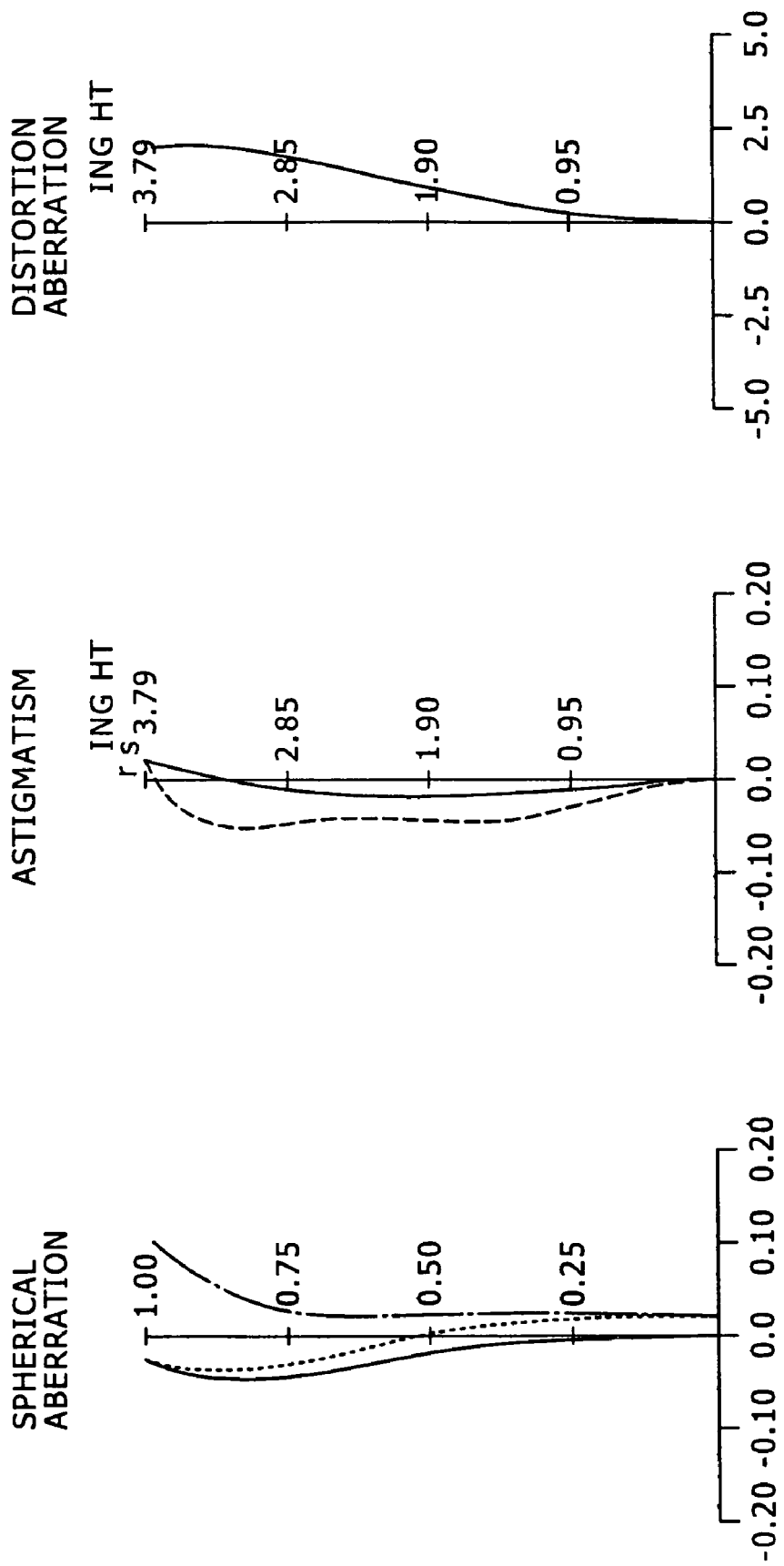
FIG. 8 shows various aberration diagrams of the zoom lens according to the second embodiment in an intermediate focal distance position.
Figure 9:
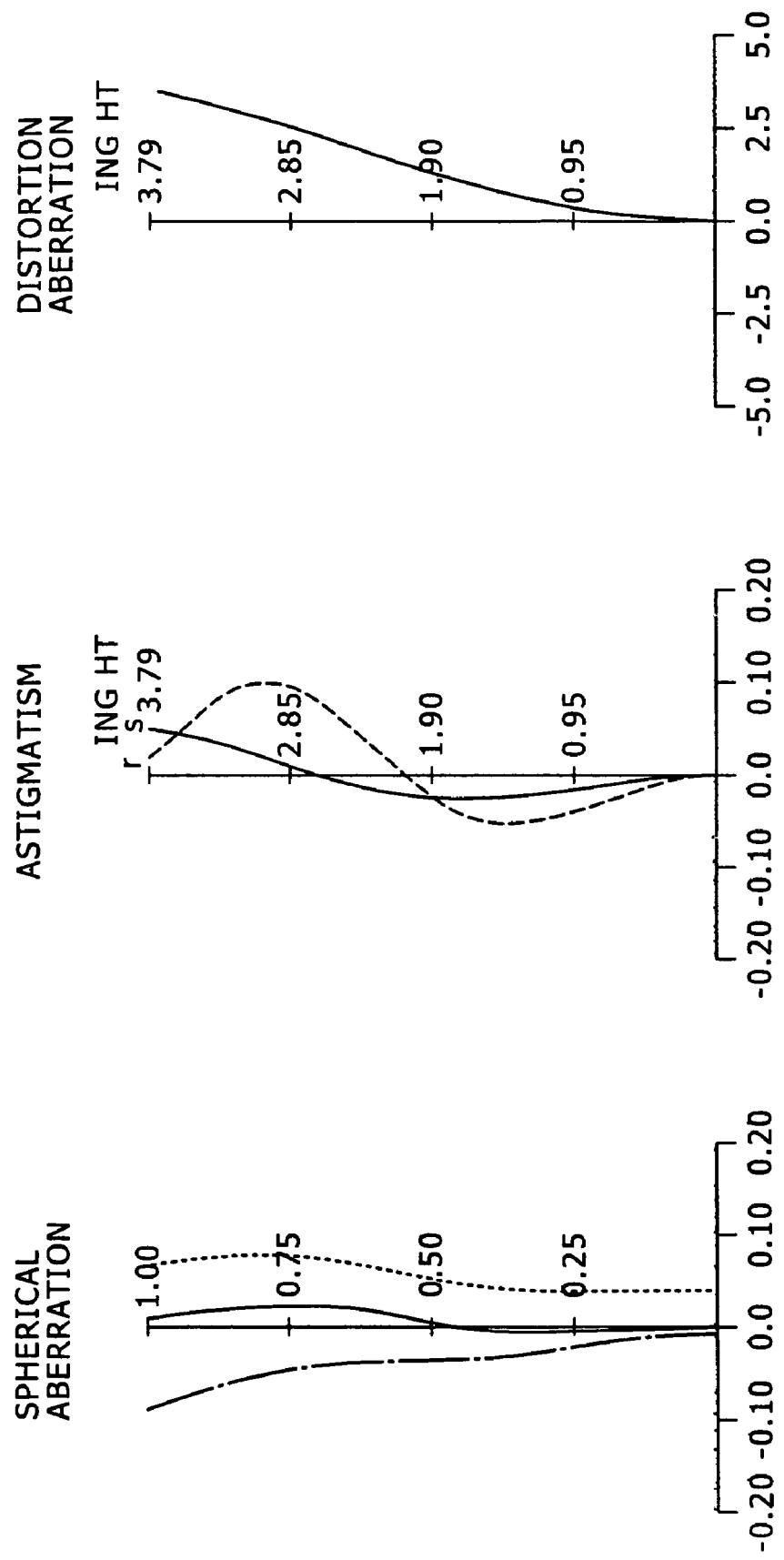
FIG. 9 shows various aberration diagrams of the zoom lens according to the second embodiment in a long focal distance position.
Figure 10:
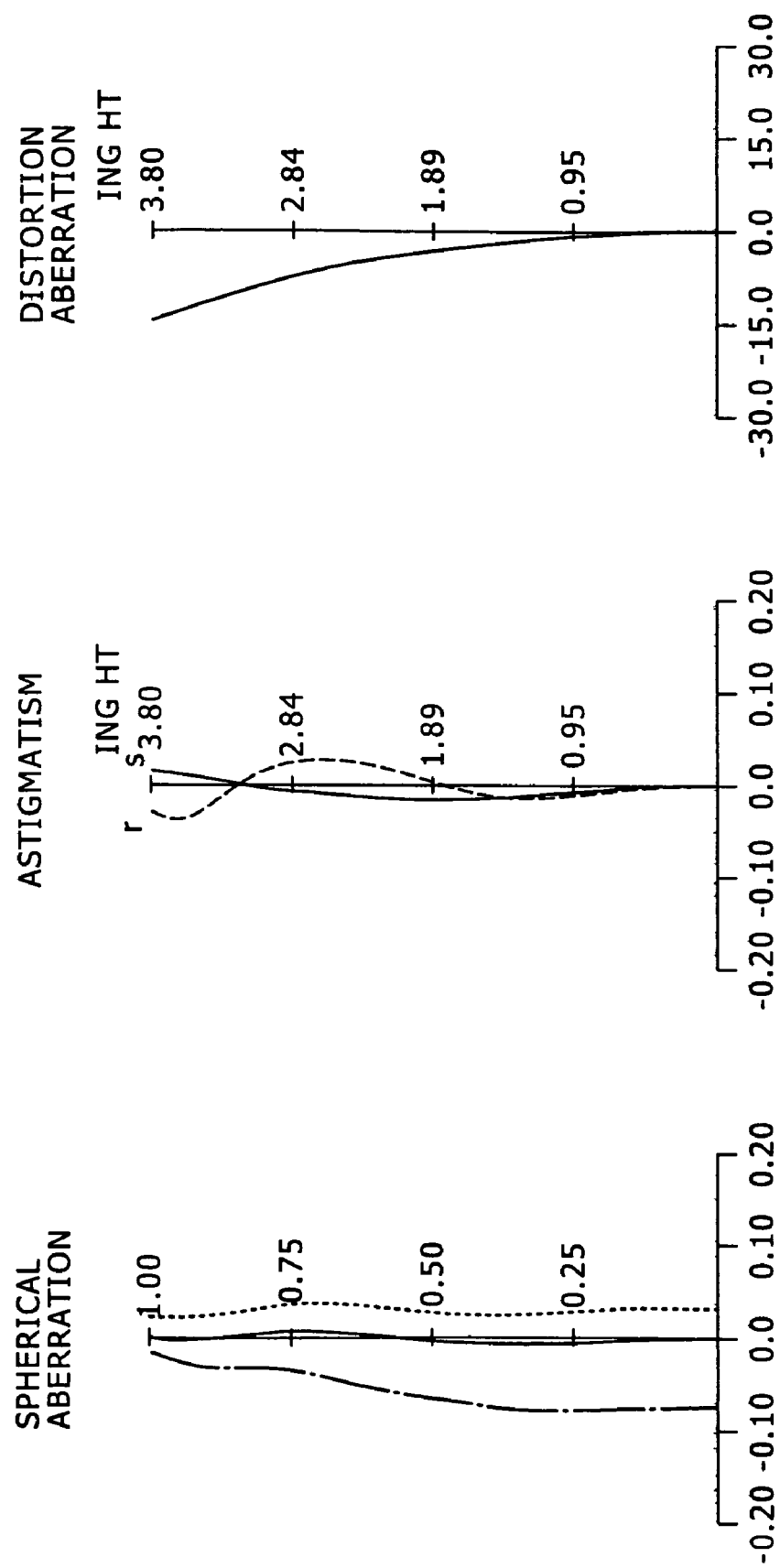
FIG. 10 shows various aberration diagrams of the zoom lens according to the third embodiment in the short focal distance position.
Figure 11:
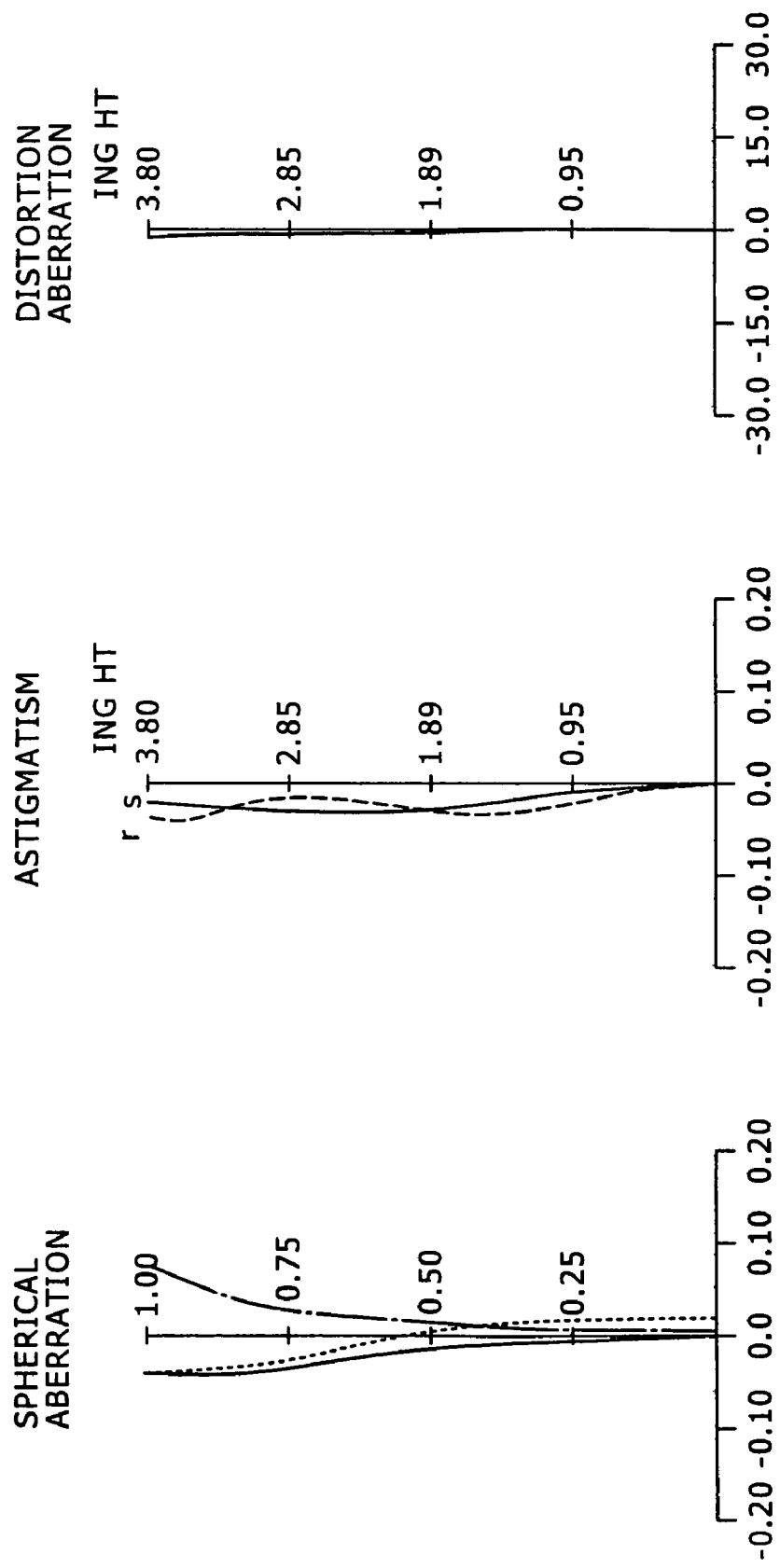
FIG. 11 shows various aberration diagrams of the zoom lens according to the third embodiment in an intermediate focal distance position.
Figure 12:
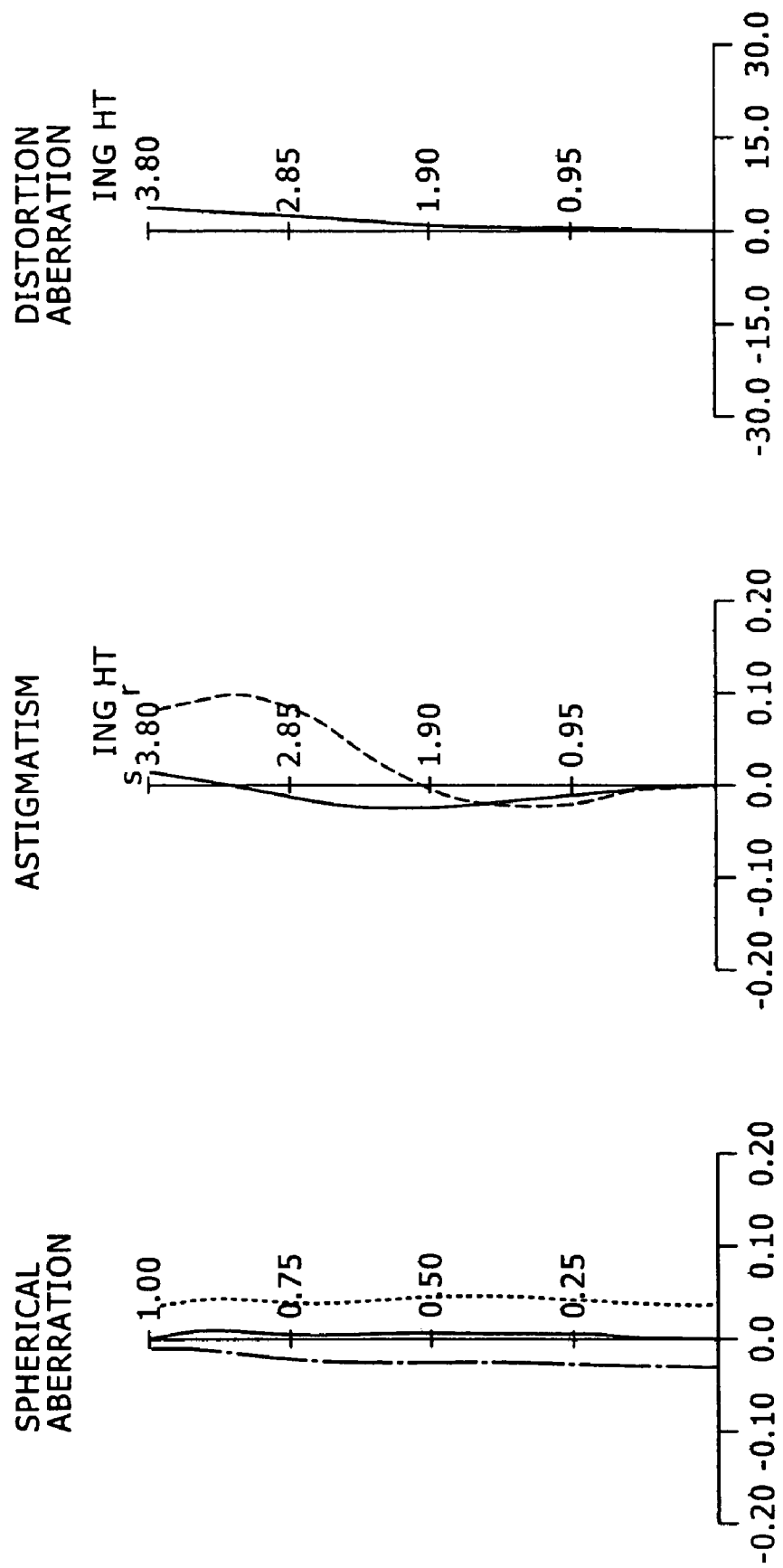
FIG. 12 shows various aberration diagrams of the zoom lens according to the third embodiment in a long focal distance position.

FIGS. 4 to 12, respectively, shows various aberration diagrams of the zoom lens according to the first embodiment in short small focal distance end positions. FIG. 4 shows various aberration diagrams according to the first embodiment in a short focal distance end position; FIG. 5 shows various aberration diagrams according to the first embodiment in an intermediate focal distance end position; and FIG. 6 shows various aberration diagrams according to the first embodiment in a long focal distance end position. FIG. 7 shows various aberration diagrams according to the second embodiment in a short focal distance end position; FIG. 8 shows various aberration diagrams according to the second embodiment in an intermediate focal distance end position; and FIG. 9 shows various aberration diagrams according to the second embodiment in a long focal distance end position. FIG. 10 shows various aberration diagrams according to the third embodiment in a short focal distance end position; FIG. 11 shows various aberration diagrams according to the third embodiment in an intermediate focal distance end position; and FIG. 12 shows various aberration diagrams according to the third embodiment in a long focal distance end position.

In the respective diagram, for the spherical aberration, the vertical axis represents the ratio to an open F-number, the horizontal axis represents the defocus, a solid line is the d line, a broken line is the c line, and a single-dotted chain line is the g line. For the astigmatism, the vertical axis represents the image height, the horizontal axis represents the focus, the solid line represents a sagittal image plane, and the broken line represents a meridional image plane. For the distortion aberration, the vertical axis represents the image height, and the horizontal axis represents the distortion (%).

In the respective one of the zoom lens according to the first to third embodiments, as apparent from Table 4, Conditional Expression (1) is satisfied. In addition, as apparent from the respective aberration diagram, the respective aberrations are corrected with good balancing in the wide-angle end position, intermediate focal distance position between the wide-angle end position and the telescopic end position, and the telescopic end position.

While the shapes and constructions of the individual portions are described and shown in detail with reference to the embodiment and examples, they are merely practical examples for carrying out the present invention, so that they should not be construed as limiting the technical scope of the invention.

Industrial Applicability

The zoom lens of the present invention is adaptable not only to imaging apparatuses such as digital still cameras and digital video cameras, but also to imaging function portions incorporated in, for example, mobile phones, personal computers, and personal digital assistants (PDAS)

The invention claimed is:

1. A zoom lens comprising a plurality of lens groups for performing zooming by changing inter-group distances between the lens groups, in which said plurality of lens groups include, from an object side of said zoom lens, a first lens group, a second lens group, a third lens group, a fourth lens group, and a fifth lens group, wherein said first lens group has a positive refractive power, in which a reflection member for bending an optical axis is provided in said first lens group and the reflection member is formed of a prism having a negative refractive power, and wherein said second lens group and said fourth lens group are movable along the optical axis, and said first lens group, said third lens group and said fifth lens group are fixed on the optical axis.

2. A zoom lens according to claim 1, in which the reflective member is disposed on the most object side.

3. A zoom lens according to claim 1, in which the reflective member is formed of a prism satisfying Conditional Expression (1):

1.7<Npd (Conditional Expression (1)) where, Npd=a refraction index of the prism forming the reflective member.

4. The zoom lens according to claim 1, in which the second lens group has a negative refractive power, the third lens group has a positive refractive power, the fourth lens group has a positive refractive power, and the fifth lens group has a negative refractive power.

5. A zoom lens comprising a plurality of lens groups for performing zooming by changing inter-group distances between the lens groups, in which said plurality of lens groups include, from an object side of said zoom lens, a first lens group, a second lens group, a third lens group, a fourth lens group, and a fifth lens group, wherein a reflective member for bending an optical axis is disposed in said first lens group and the reflection member is formed of a prism having a negative refractive power and an intermediate aperture position is fixed during zooming, and wherein said second lens group and said fourth lens group are movable along the optical axis, and said first lens group, said third lens group and said fifth lens group are fixed on the optical axis.

6. A zoom lens according to claim 5, in which the reflective member is disposed on the most object side.

7. The zoom lens according to claim 5, in which the first lens group has a positive refractive power, the second lens group has a negative refractive power, the third lens group has a positive refractive power, the fourth lens group has a positive refractive power, and the fifth lens group has a negative refractive power.

8. The zoom lens according to claim 5, in which the reflective member is formed of a prism satisfying Conditional Expression (1):

1.7<Npd (Conditional Expression (1)) where, Npd=a refraction index of the prism forming the reflective member.

9. An imaging apparatus comprising a zoom lens having a plurality of lens groups for performing zooming by changing inter-group distances between the lens groups, and an imaging device for converting an optical image formed by the zoom lens to an electric signal, in which said plurality of lens groups include, from an object side of said zoom lens, a first lens group, a second lens group, a third lens group, a fourth lens group, and a fifth lens group, wherein said first lens group has a positive refractive power, in which a reflection member for bending an optical axis is provided in said first lens group and the reflection member is formed of a prism having a negative refractive power, and wherein said second lens group and said fourth lens group are movable along the optical axis, and said first lens group, said third lens group and said fifth lens group are fixed on the optical axis.

10. An imaging apparatus according to claim 9, in which the reflective member is formed of a prism satisfying Conditional Expression (1):

1.7<Npd (Conditional Expression (1)) where, Npd=refraction index of the prism forming the reflective member.

11. An imaging apparatus according to claim 9, in which the reflective member is disposed on the most object side.

12. The imaging apparatus according to claim 9, in which the second lens group has a negative refractive power, the third lens group has a positive refractive power, the fourth lens group has a positive refractive power, and the fifth lens group has a negative refractive power.

13. An imaging apparatus comprising a zoom lens having a plurality of lens groups for performing zooming by changing inter-group distances between the lens groups, and an imaging device for converting an optical image formed by the zoom lens to an electric signal, in which said plurality of lens groups include, from an object side of said zoom lens, a first lens group, a second lens group, a third lens group, a fourth lens group, and a fifth lens group, wherein a reflective member for bending an optical axis is disposed in said first lens group and the reflection member is formed of a prism having a negative refractive power and an intermediate aperture position is fixed during zooming, and wherein said second lens group and said fourth lens group are movable along the optical axis, and said first lens group, said third lens group and said fifth lens group are fixed on the optical axis.

14. An imaging apparatus according to claim 13, in which the reflective member is disposed on the most object side.

15. The imaging apparatus according to claim 13, in which the first lens group has a positive refractive power, the second lens group has a negative refractive power, the third lens group has a positive refractive power, the fourth lens group has a positive refractive power, and the fifth lens group has a negative refractive power.

16. The imaging apparatus according to claim 13, in which the reflective member is formed of a prism satisfying Conditional Expression (1):

1.7<Npd (Conditional Expression (1)) where, Npd=refraction index of the prism forming the reflective member.

* * * * *